United States Patent
Sharp et al.

(10) Patent No.: US 7,092,698 B1
(45) Date of Patent: Aug. 15, 2006

(54) METHOD AND APPARATUS FOR SETTING UP SIMULTANEOUS CALLS

(75) Inventors: Andrew Sharp, Lidingö (SE); Martin Stümpert, Hochspeyer (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/531,917

(22) Filed: Mar. 21, 2000

(30) Foreign Application Priority Data

Mar. 22, 1999 (EP) .................................. 99105742

(51) Int. Cl.
*H04M 3/42* (2006.01)
(52) U.S. Cl. ..................................... 455/414; 455/567
(58) Field of Classification Search ........ 455/414–417, 455/168.1, 416, 517, 557, 415–420, 433, 455/69–71, 422, 434, 445, 515, 567, 520, 455/463–464, 426; 379/202.01, 205.01, 379/201.01, 207.01, 156–158, 201, 112, 93.17, 379/202.02
See application file for complete search history.

(56) References Cited

U.S. PATENT DOCUMENTS 5,438,612 A * 8/1995 Norimatsu .................. 455/565

(Continued)

FOREIGN PATENT DOCUMENTS

| EP | 0 758 175 A1 | 2/1997 |
|----|-----|------|
| EP | 0758175 A | 2/1997 |
| EP | 763940 A2 * | 3/1997 |
| GB | 2 320 162 A | 6/1998 |
| GB | 2320162 A * | 6/1998 |
| JP | 408321882 A * | 12/1996 |
| WO | WO 96/08937 | 3/1996 |
| WO | WO 98/25358 | 6/1998 |
| WO | WO 00/16576 | 3/2000 |
| WO | WO0027154 A1 * | 5/2000 |

OTHER PUBLICATIONS

Baas, G.; European Search Report, App. No. EP 99105742, Aug. 31, 1999, pp. 1-3.
ETSI; Digital Cellular Telecommunications System; MultiParty (MPTY) Supplementary Services-—Stage 1; GSM 02.84 Version 5.0.0: Nov. 1996, pp. 1-14.
ETSI; Digital Cellular Telecommunications System; Call Waiting (CW) and Call Holding (HOLD) Supplementary Services—Stage 1; GSM 02.83 Version 5.0.0: Nov. 1996, pp. 1-13.
ETSI; Universal Mobile Telecommunications System (UMTS); UMTS phase 1 (UMTS 220 V2.0.0 (Jan. 1999), pp. 1-13.
Baas, G., International Search Report, International App. No. PCT/EP00/01495, Jun. 14, 2000, pp. 1-7.

*Primary Examiner*—Pablo N. Tran (57) ABSTRACT

The invention relates to a method and logical units for providing services in a mobile communication system. In the mobile communication system a number of calls are handled for one user. The calls may have different bearer capabilities. In case a further call with its bearer capability requests a set-up, either another parallel call can be set-up or a call can be put on hold or can be disconnected or can be put in a waiting stage. Further to this the bearer capabilities of the number n+1 of calls are checked in order to determine whether any of the n calls have the same bearer capabilities. Further to this it is checked whether any of the calls fulfills bearer requirements and can be taken on hold. If any of the calls meets the requirement, the call is put on hold and the further call is set up.

In addition to this services like a conference call and call forwarding are provided.

23 Claims, 8 Drawing Sheets

U.S. PATENT DOCUMENTS

| | | | |
|---|---|---|---|
| 5,579,375 A * | 11/1996 | Ginter | 455/417 |
| 5,754,638 A * | 5/1998 | Kusunoki | 379/212.01 |
| 5,937,051 A * | 8/1999 | Hurd et al. | 379/212.01 |
| 5,995,822 A * | 11/1999 | Smith et al. | 455/406 |
| 6,055,424 A * | 4/2000 | Tornqvist et al. | 455/414.4 |
| 6,055,430 A * | 4/2000 | Cooper et al. | 455/445 |
| 6,144,647 A * | 11/2000 | Lopez-Torres | 370/329 |
| 6,188,899 B1 * | 2/2001 | Chatterjee et al. | 455/435.1 |
| 6,324,405 B1 * | 11/2001 | Young et al. | 455/456.1 |
| 6,633,635 B1 * | 10/2003 | Kung et al. | 379/215.01 |

\* cited by examiner

METHOD AND APPARATUS FOR SETTING UP SIMULTANEOUS CALLS

BACKGROUND OF THE INVENTION

1. Technical Field of the Invention

The invention relates to a method and logical units for providing services in a mobile communication system wherein a number of calls with different bearer capabilities are handled.

2. Description of Related Art

When communicating via a mobile communication system, in some cases a subscriber is called by a third party or wants to communicate with a plurality of parties. The GSM (Global System for Mobile communication) communication system supports this by offering so called supplementary services, e.g. call waiting, call hold, call forwarding on busy subscriber and multi party call. All these services are provided by the network and are activated by the mobile user.

A core network consists at least of entities that provide support for the network features and telecommunication services. The support provided may include for example a functionality of the management of user location information, the control of network features and services, the transfer mechanisms for signalling and for user generated information.

In the following these definitions are used, user B is a user who is engaged in a call with a user A. User A is the mobile user who is provided by the network with the respective supplementary service or supplementary services. User C is a user, who originates a call to user A, or is called by user A.

Call waiting enables user A to receive a call from user C. The call from user C is put on call waiting and an indication is sent to user B. User B can put the call with user A on hold and accept the call from user C. He can also reject the call from user C so that this call can be forwarded by the call forwarding on busy subscriber service. If user B accepts the call from C, he can set up a multi party call including user A in the active call with user C (ETSI Standards GSM02.83 and GSM02.84, version 5.0.0, November 1996).

Figure 11A:
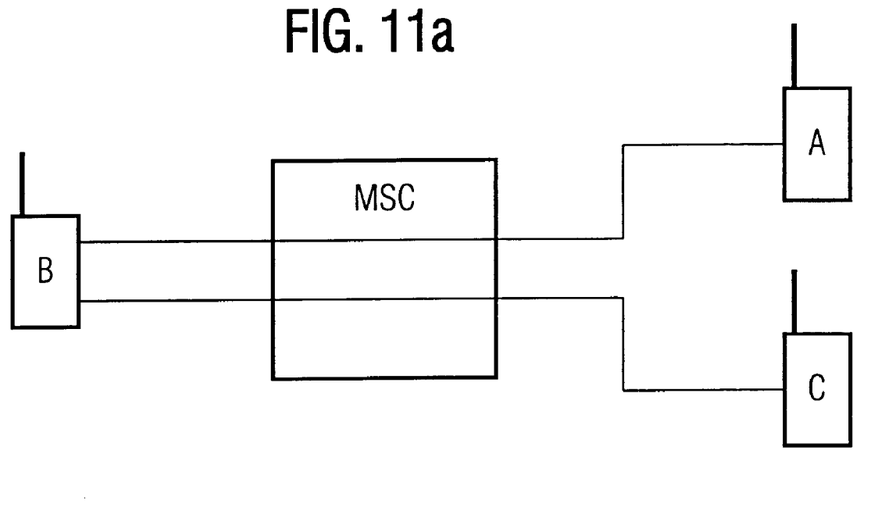
FIG. 11a: a multiple call
Figure 11B:
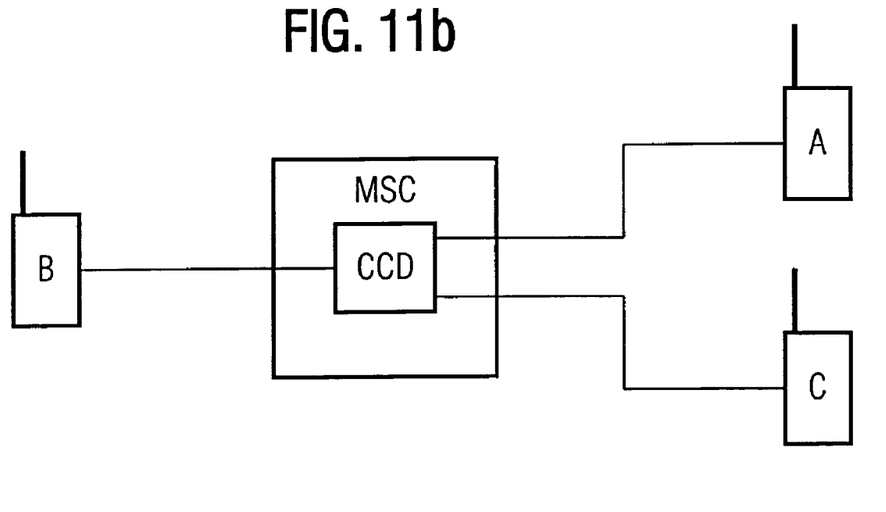
FIG. 11b: a multi party call.

FIG. 11b shows an example of a multi party call between three users A, B, C. In this example the multi party call is active and handled by an conference call device CCD in a mobile services switching center MSC. A conference call device is a device that can connect more than two parties with each other at the same time.

The GSM communication system also offers packet switched data services as the GPRS (General Packet Radio Service). However there are still shortcomings in the setup of several calls in parallel, as it is still not possible for example to do an active speech call, Internet browsing and the reception of a fax at the same time.

To overcome these shortcomings, a so-called UMTS (Universal Mobile Telecommunication Service) is under development. One of the principles of this communication system is the provision of multiple calls, which means that one user is able to handle multiple calls at the same time (ETSI Standard UMTS 22.00 version 2.0.0, January 1999).

The UMTS (Universal Mobile Telecommunication System) communication system is capable of handling several calls to one mobile user equipment, the so-called multiple call capability. Opposite to a GSM (Global System for Mobile communication), the UMTS communication system neither releases a first call nor puts a first call on hold. The UMTS communication system sets up several calls in parallel to one mobile user equipment. This enables a mobile user to use several applications at the same time. For example a mobile user can have a speech call while receiving a fax and doing a data call. Even several calls of the same kind, as for example multiple data calls are possible. FIG. 11a shows an example of a possible implementation of a multiple call from a device B and a device C to a mobile user equipment A. In this example the multiple calls are handled in parallel by a mobile services switching center MSC.

It is a shortcoming of the known UMTS that there is no description how a mobile user can for example set up a speech call to two subscribers at the same time providing also a connection between these two subscribers.

It is a further shortcoming of the known prior art that there is no handling for the case that network resources for setting up multiple calls are exhausted.

Therefore it is an object of the present invention to provide a mobile user in a mobile communication system that supports a number of calls with the same or different bearer capabilities for one mobile user with additional services.

This problem is solved advantageously by the method of claim 1 and the logical units of claim 16 and 17.

It is advantageous that the air interface between a mobile user equipment and the core network is used for only one call and by that uses the radio resources more efficiently, this enables an operator to offer more calls at the same time.

Further advantageous is that the communication system and the mobile user equipment provide more flexibility of call handling to the mobile user, in that the mobile user can decide on a per call basis how the user wishes to accept a new call.

It is further advantageous, that the mobile user equipment has to use fewer calls, this saves battery power and increases the stand-by time and active call time of a mobile user equipment.

Another advantage is that the system uses services known to a mobile user familiar with GSM, this reduces the time a user needs to accept and get used to the new system.

It is further advantageous that the system uses services known to a mobile user familiar with GSM. This reduces the time a user needs to get used to the new services and it reduces the time until a new user makes use of the new services.

It is advantageous that the connection hardware is placed in the core network instead of having it into the mobile user equipment, this reduces the costs and the size of the mobile user equipment.

Further advantageous embodiments of the invention are found in the claims 2 to 15 and claims 18 to 23.

It is advantageous according to the depending claims that the user defined settings for taking a decision, whether a call should be set up as a new parallel call, a call should be put on hold or a call should be rejected can be defined once for all further calls, this makes the use of the service more comfortable for a mobile user.

Another advantage according to the depending claims is that the user defined settings for taking a decision, whether a call should be set up as a new parallel call, a call should be put on hold or a call should be rejected can be defined before each originating call, this makes the use of the service more flexible for a mobile user.

Further advantageous is according to the depending claim that the user defined settings for making a decision, whether a call should be set up as a new parallel call, a call should be put on hold or a call should be rejected can be defined before each first attachment to a mobile communication system that supports multiple calls, this offers a good compromise between the flexibility and convenience of the service.

Further advantageous is according to the depending claim that the decision logic is fully implemented in the mobile user equipment, this reduces the necessary processing in the core network and improves the performance of the core network so that the core network can handle more call attempts in the same time.

Another advantageous according to the depending claims is that the decision logic is fully implemented in the mobile user equipment, this reduces the necessary transfer of information between the mobile user equipment and the core network and allows more chargeable traffic on the air interface.

Further advantageous is according to the depending claims that the decision logic is partly implemented in the core network, this reduces the necessary signalling in the case that a terminating call is attempted to the mobile user equipment.

BRIEF DESCRIPTION OF THE DRAWINGS

In the following the invention will be further described by means of examples and by means of the figures. The following figures show.

DETAILED DESCRIPTION OF THE DRAWINGS

The sequences according to the figures Ito 10 are only a part of a whole signal transfer process necessary. However, due to clarity only necessary parts are shown.

In the following the word call is used as an equivalent to the word connection and is explicitly not restricted to the meaning of speech call but as every kind of connection that could be set up with a mobile user equipment.

A mobile user equipment as it should be understood is an equipment that is capable of communicating wirelessly via a communication system. It is for example, a mobile computer capable of communicating, a mobile phone or a mobile multimedia system.

In the following the method according to the invention will be further described. The following part of the description describes the invention in general and following this the invention will be further described by means of the FIGS. 1–10.

A method for providing services in a mobile communication system, wherein a number of n calls, with n=1,2,3, ... of m different bearer capabilities, with m=1,2,3, ... , are handled includes the following steps. A request for a set-up of a further call is n+1 is either received or sent while the number n of calls with m different bearer capabilities are already set up. Further a decision is taken whether to set up a parallel call or to set up a further call n+1 by choosing one call to be put on hold and by using a bearer with bearer capabilities for the new call.

As it may be useful to assign a bearer capability of another call that is already set up, the following further steps are performed. The bearer capabilities of the n+1 calls are compared. It is determined whether any of the number of n calls have the same bearer capability m as the further call n+1, and one of the n calls with the same bearer capability as the further call are chosen to be put on hold. Then the chosen call is put on hold and sending of an acknowledgement and setting up the further call is performed.

In case there is not any same bearer capability existing, the method for providing services provides the further steps of determining whether any of the number n of calls have a bearer capability sufficient to be used for the further call. Sufficient means that the bearer requirement of a new call attempt are fulfilled and the call could be set up according to this one of the possible calls can be put on hold. However, as there may be a variety the user either has to choose or the choice is done automatically.

In a first example of the invention, a core network UMTS CN, e.g. a mobile communication system, contains a logical unit LU with means for comparing bearer requirements on bearer capabilities of an incoming call attempt with bearer capabilities of an active call.

Bearer requirements should be understood as bearer capabilities that have to be fulfilled by a bearer that is used by a call. These requirements could be but are not limited to delay, delay jitter, data rates, bit error rates, error detection, error correction and further requirements.

An incoming call attempt is an attempt to terminate a call on a mobile user equipment UE.

The logical unit LU in the core network UMTS CN further contains a means for deciding whether an incoming call attempt should be put on call waiting or not and a storage means to store information about active calls, at least bearer capabilities, bearer identification and call identification.

This decision can be based on user settings, information about current states of the communication network as for example traffic load, on information about the incoming call attempt and on information about the mobile user equipment and its capabilities.

The mobile user equipment contains a first logical unit LU1 with means for deciding whether a call should be put on hold and which call should be put on hold. The first logical unit LU1 also contains a means for detecting whether the bearer requirements of an incoming call request are fulfilled by a bearer already used by an active call of the mobile user equipment UE. As an example the bearer requirements of an incoming call request that is a data call are fulfilled by an speech call, but not the other way around. The first logical unit LU1 also contains storage means to store information about the active calls, at least bearer capabilities and call identification.

Figure 1:
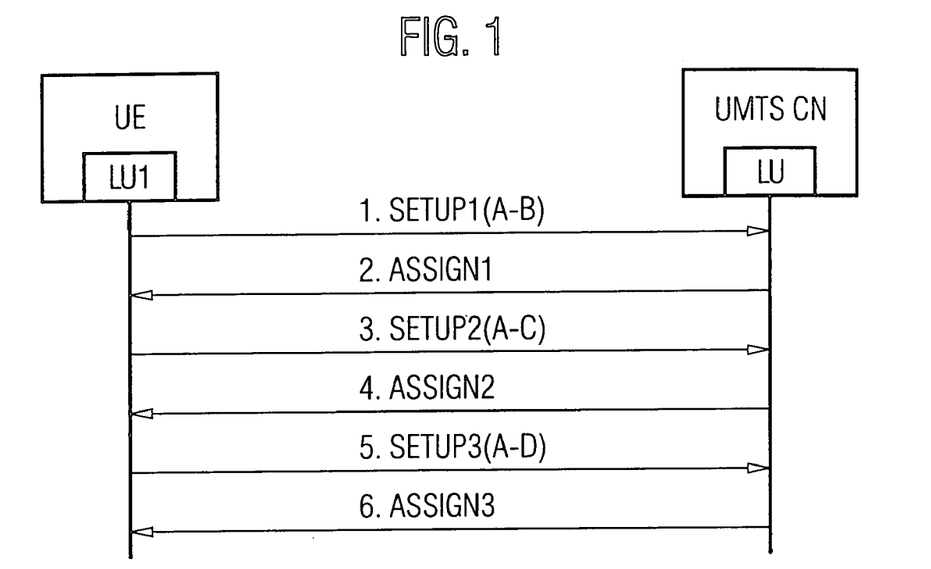
FIG. 1: a signal sequence for the setup of three parallel calls in a communication system for a mobile terminating call.

In the following, an example is described by means of FIG. 1.

The mobile user equipment UE sets up a first call in a first step by sending a setup message SETUP1(A–B) to the core network UMTS CN, e.g. a mobile communication system. This message contains at least information about the requested call type, the subscriber the call should be connected to, and a call identification. A call type is an information identifying the type of call, e.g. a full rate speech call or a 64 kbit/s data call. The core network UMTS CN answers in a second step by sending an assign message ASSIGN1, which confirms the requested call and contains at least a bearer identification for the call that has been successfully set up. This orders the core network UMTS CN and the mobile user equipment UE to set up a user plane for the requested bearer. The first logical unit LU1 and the logical unit LU store the relevant information about the call.

The mobile user equipment UE sets up a second call in a third step by sending a setup message SETUP2(A–C) to the core network UMTS CN. This message contains at least information about the requested call type, the subscriber the call should be connected to, and a call identification. The core network UMTS CN answers in a fourth step by sending an assign message ASSIGN2, which confirms the requested call and contains at least a bearer identification for the call that has been successfully set up. This orders the core network UMTS CN and the mobile user equipment UE to set up a user plane for the requested bearer. The first logical unit LU1 and the logical unit LU store the relevant information about the call.

It has to be mentioned here, that the set up of the first and the second call as mobile originated calls is only chosen by example and should not be seen as a limit of the invention.

The user equipment UE sets up a third call in a fifth step by sending a setup message SETUP3(A–D) to the core network UMTS CN. This message contains again at least information about the requested call type, the subscriber the call should be connected to, and a call identification. The core network UMTS CN answers in a sixth step by sending an assign message ASSIGN3, which confirms the requested call and contains at least a bearer identification for the call that has been successfully set up. This orders the core network UMTS CN and the mobile user equipment UE to set up a user plane for the requested bearer. The first logical unit LU 1 and the logical unit LU store the relevant information about the call.

As described before a number n of calls is set up in parallel. In the example the number of calls that are set up in parallel is three. However, as already mentioned the bearer requirements of every call could be different. The n calls can have a number of m different bearer capabilities or can have only one different bearer capabilities. Then for n=3 calls, m=1,2 or 3 bearer capabilities are possible, which means for m=1 that all calls are of the same type and for m=3 that all calls are of different type.

Figure 2:
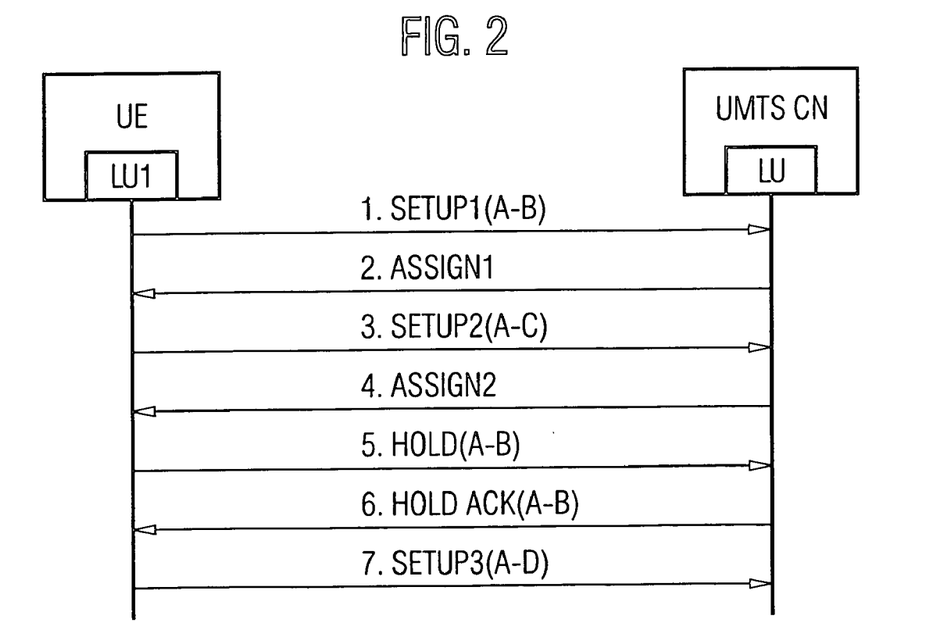
FIG. 2: a signal sequence for the setup of two parallel calls and a hold procedure for a mobile originating call.

In the following the example is described by means of FIG. 2.

The mobile user equipment UE sets up a first call in a first step by sending a setup message SETUP1(A–B) to the core network UMTS CN. This message contains at least information about the requested call type, the subscriber the call should be connected to, and a call identification. The core network UMTS CN answers in a second step by sending an assign message ASSIGN1, which confirms the requested call and contains at least a bearer identification for the call that has been successfully set up. This orders the core network UMTS CN and the mobile user equipment UE to set up a user plane for the requested bearer. The first logical unit LU 1 and the logical unit LU store the relevant information about the call.

The mobile user equipment UE sets up a second call in a third step by sending a setup message SETUP2(A–C) to the core network UMTS CN. This message again contains at least information about the requested call type, the subscriber the call should be connected to, and a call identification. The core network UMTS CN answers in a fourth step by sending an assign message ASSIGN2, which confirms the requested call and contains at least a bearer identification for the call that has been successfully set up. This orders the core network UMTS CN and the mobile user equipment UE to set up a user plane for the requested bearer. The first logical unit LU1 and the logical unit LU store the relevant information about the call.

Before setting up a third call, the first logical unit LU1 in the mobile user equipment UE decides that one call should be set on hold. The first logical unit LU1 decides that the first call is put on hold. The mobile user equipment informs the core network UMTS CN about this decision by sending a hold message HOLD(A–B). This message includes an information that a call should be put on hold and a call identification of the call. The core network UMTS CN puts the call on hold and acknowledges by sending a message HOLD ACK(A–B) which includes a call identification of the call that has been put on hold.

Afterwards the mobile user equipment starts to set up a third call reusing the bearer of the first call by sending a set up message SETUP3(A–D) to the core network. The information which bearer has been used by the first call can either be stored in the storage means to store of the first logical unit LU1 or can be included in the acknowledgement message HOLD ACK(A–B).

As mentioned before the first logical unit LU1 decides that a call should be put on hold instead of allowing a further parallel call. As will be subject to a further part of the description, the logical units can be either programmed in that way that for every call a decision has to be taken if the call should be put on hold or if a parallel call is allowed, or that this is defined only once or that this has to be defined before every call.

In case that the bearer capability of the call put on hold is the same as the bearer capability of the new call that is set up, a service Multiparty Call can be invoked. In case that two bearer capabilities of the call differ, an overwriting assignment is performed. The overwriting assignment will be further described according to FIG. 7.

Figure 3:
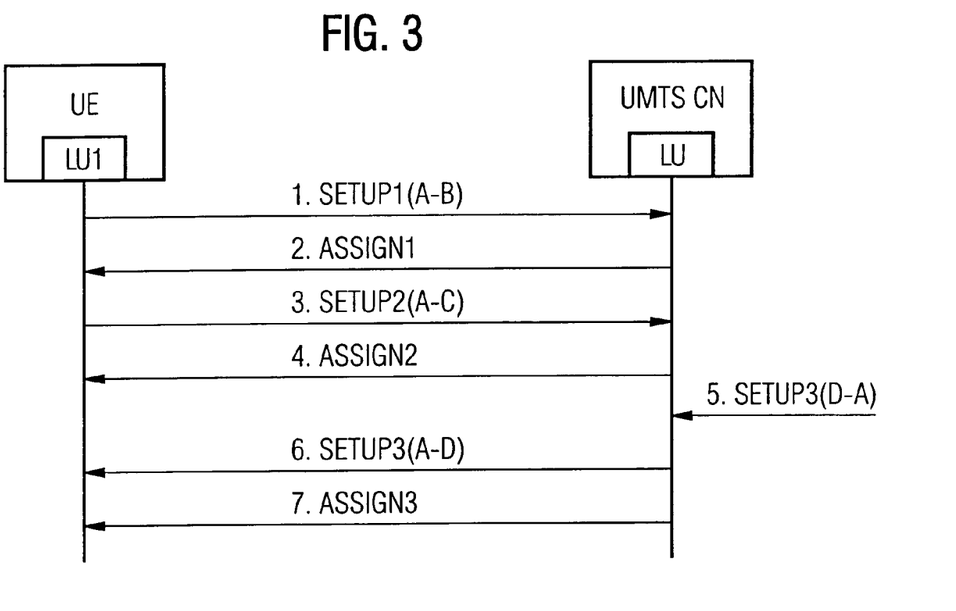
FIG. 3: a signal sequence for the setup of three parallel calls in a communication system for a mobile terminating call.

In the following the example is described by means of FIG. 3. The mobile user equipment UE sets up a first call in a first step by sending a setup message SETUP1(A–B) to the core network UMTS CN. This message contains at least information about the requested call type, the subscriber the call should be connected to, and a call identification. The core network UMTS CN answers in a second step by sending an assign message ASSIGN1, which confirms the requested call and contains at least a bearer identification for the call that has been successfully set up. This orders the core network UMTS CN and the mobile user equipment UE to set up a user plane for the requested bearer. The first logical unit LU 1 and the logical unit LU store the relevant information about the call.

The mobile user equipment UE sets up a second call in a third step by sending a setup message SETUP2(A–C) to the core network UMTS CN. This message contains at least information about the requested call type, e.g. a data call, the subscriber the call should be connected to, and a call identification. The core network UMTS CN answers in a fourth step by sending an assign message ASSIGN2, which confirms the requested call and contains at least a bearer identification for the call that has been successfully set up. This orders the core network UMTS CN and the mobile user equipment UE to set up a user plane for the requested bearer. The first logical unit LU 1 and the logical unit LU store the relevant information about the call.

The core network

CN receives a message SETUP3(D–A) indicating an incoming call attempt from a user D to A. The logical unit LU in the core network UMTS CN decides that the incoming call will be set up as a new parallel call and sends a set up message SETUP3(D–A) and an assign message ASSIGN3 to the mobile user equipment UE. These messages contain at least information about the requested call type, the subscriber the call should be connected to, a call identification, and a bearer identification.

Figure 4:
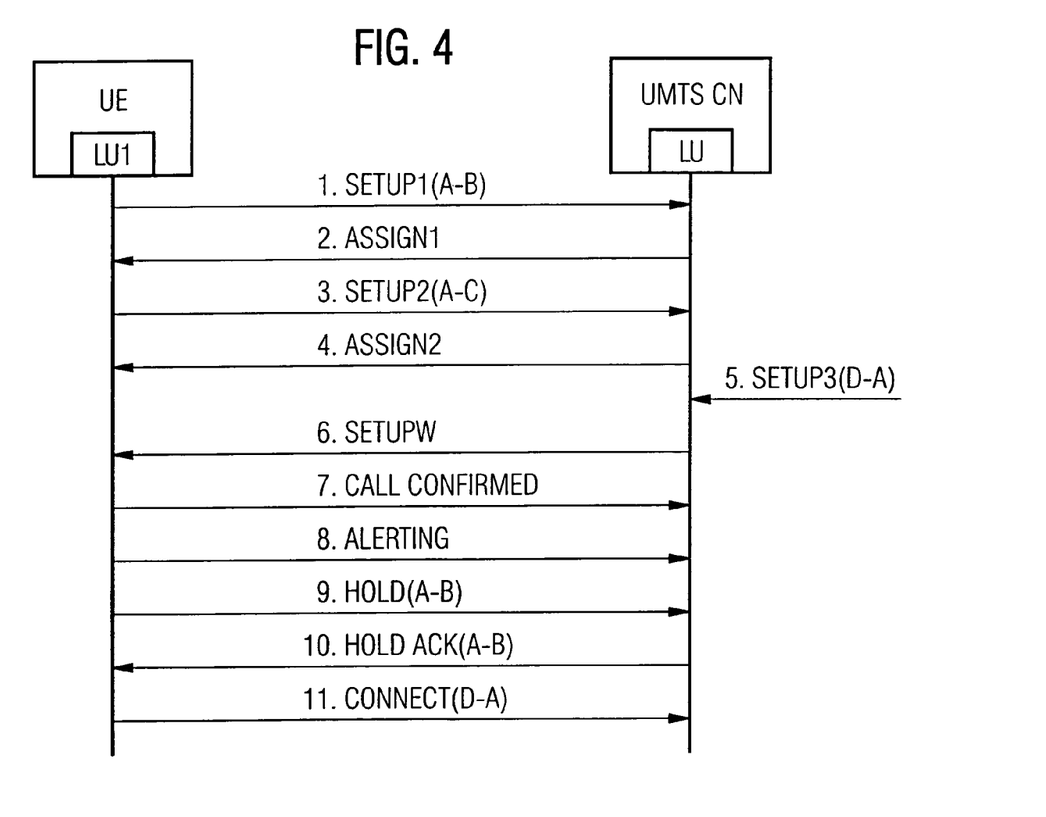
FIG. 4: a signal sequence for the setup of two parallel calls and the hold procedure for a mobile terminating call.

In the following the example is described by means of FIG. 4. The mobile user equipment UE sets up a first call in a first step by sending a setup message SETUP 1(A–B) to the core network UMTS CN. This message contains at least information about the requested call type, the subscriber the call should be connected to, and a call identification. The core network UMTS CN answers in a second step by sending an assign message ASSIGN 1, which confirms the requested call and contains at least a bearer identification for the call that has been successfully set up. This orders the core network UMTS CN and the mobile user equipment UE to set up a user plane for the requested bearer. The first logical unit LU1 and the logical unit LU store the relevant information about the call.

The mobile user equipment UE sets up a second call in a third step by sending a setup message SETUP2(A–C) to the core network UMTS CN, requesting the set-up of a call from a user A to a user C. This message contains at least information about the requested call type, e.g. a speech call, the subscriber the call should be connected to, and a call identification. The core network UMTS CN answers in a fourth step by sending an assign message ASSIGN2, which confirms the requested call and contains at least a bearer identification for the call that has been successfully set up. This orders the core network UMTS CN and the mobile user equipment UE to set up a user plane for the requested bearer. The first logical unit LU1 and the logical unit LU store the relevant information about the call.

The core network UMTS CN receives a message SETUP3 (D–A) indicating an incoming call attempt from user D to user A. The logical unit LU in the core network UMTS CN decides that the incoming call will be offered as a waiting call and sends a call waiting indication message SETUPW to the mobile user equipment UE. This message contains at least information about the requested call type, the subscriber the call should be connected to, and a call identification. The first logical unit LU1 decides to accept this waiting call and the mobile user equipment UE informs the core network UMTS CN with CALL CONFIRMED. The mobile user equipment UE initiates the signaling towards the calling party by sending an alerting message ALERTING to the core network UMTS CN. The first logical unit LU1 in the mobile user equipment UE decides to put the first call on hold. The mobile user Equipment UE informs the core network UMTS CN by sending a hold message HOLD (A–B). This message includes an information that a call should be put on hold and a call identification of the call. The core network UMTS CN puts the call on hold and acknowledges by sending a message HOLD ACK(A–B) which includes a call identification of the call that has been put on hold.

Afterwards the mobile user equipment accepts the waiting call e.g. by reusing the bearer of the first call by sending a set up message CONNECT(D–A) to the core network. The information which bearer has been used by the first call can either be stored in the storage means of the first logical unit LU 1 or can be included in the acknowledgement message HOLD ACK(A–B).

Figure 5:
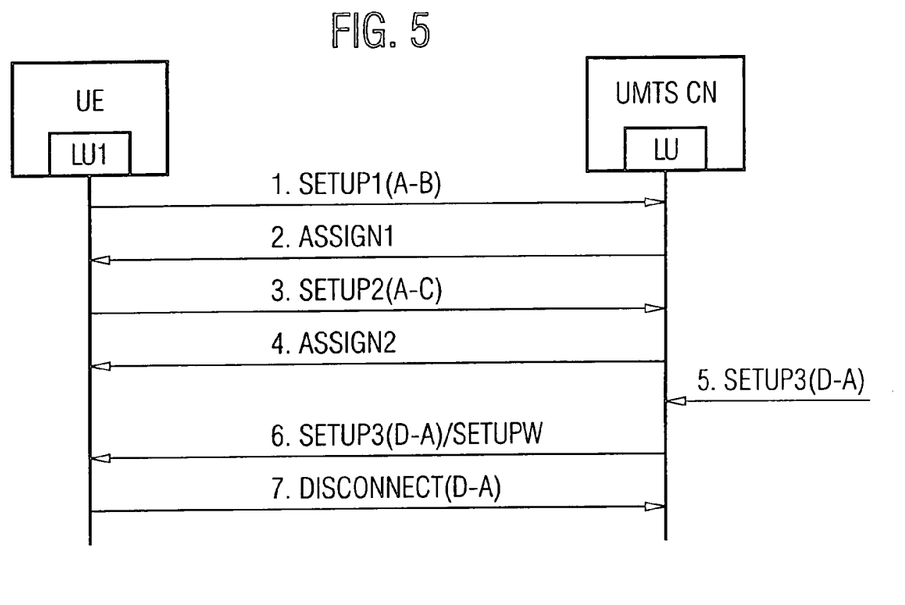
FIG. 5: a signal sequence for the setup of two parallel calls and the rejection of a third call.

In the following the example is described by means of FIG. 5. The mobile user equipment UE sets up a first call in a first step by sending a setup message SETUP 1(A–B) to the core network UMTS CN. This message contains at least information about the requested call type, the subscriber the call should be connected to, and a call identification. The core network UMTS CN answers in a second step by sending an assign message ASSIGN 1, which confirms the requested call and contains at least a bearer identification for the call that has been successfully set up. This orders the core network UMTS CN and the mobile user equipment UE to set up a user plane for the requested bearer. The first logical unit LU1 and the logical unit LU store the relevant information about the call.

The mobile user equipment UE sets up a second call in a third step by sending a setup message SETUP2(A–C) to the core network UMTS CN. This message contains at least information about the requested call type, the subscriber the call should be connected to, and a call identification. The core network UMTS CN answers in a fourth step by sending an assign message ASSIGN2, which confirms the requested call and contains at least a bearer identification for the call that has been successfully set up. This orders the core network UMTS CN and the mobile user equipment UE to set up a user plane for the requested bearer. The first logical unit LU1 and the logical unit LU store the relevant information about the call.

The core network UMTS CN receives a message SETUP3 (D–A) indicating an incoming call attempt. The core network UMTS CN offers this call either as a waiting call by sending a call waiting indication message SETUPW or offers it as a new parallel call by sending a setup message SETUP3(D–A). The first logical unit LU1 in the mobile user equipment UE decides to reject this call attempt. The mobile user equipment informs the core network UMTS CN by sending a message DISCONNECT(D–A) that carries at least information that a call is rejected and a call identification of the rejected call.

In a second example of the invention, the mobile user equipment contains a second logical unit LU2 with means for deciding whether a call should be handled as a new parallel call or as a waiting call. The second logical unit LU2 also contains a means for deciding whether a call should be put on hold and which call should be put on hold. The second logical unit LU2 also contains a means for detecting whether the bearer requirements of an incoming call request are fulfilled by a bearer already used by an active call of the mobile user equipment UE. The second logical unit LU2 also contains storage means to store information about the active calls, at least bearer capabilities, bearer identification and call identification.

Figure 6:
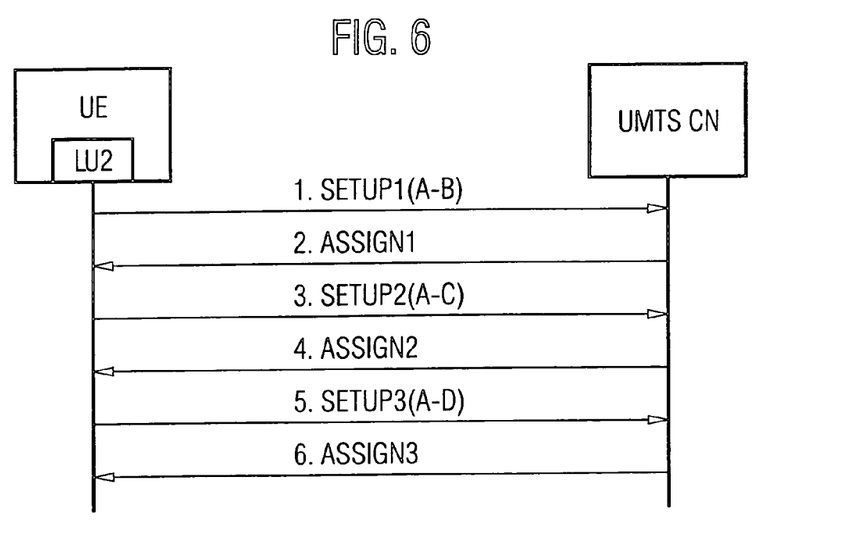
FIG. 6: a signal sequence for the setup of three parallel calls in a communication system for a mobile originating call.

In the following the example is described by means of FIG. 6. The mobile user equipment UE sets up a first call in a first step by sending a setup message SETUP 1(A–B) to the core network UMTS CN. This message contains at least information about the requested call type, the subscriber the call should be connected to, and a call identification. A call type is an information identifying the type of call, e.g. a full rate speech call or a 64 kbit/s data call or any other type of call.

The core network UMTS CN answers in a second step by sending an assign message ASSIGN1, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

The mobile user equipment UE sets up a second call in a third step by sending a setup message SETUP2(A–C) to the core network UMTS CN. This message contains at least information about the requested call type, the subscriber the call should be connected to, and a call identification. The core network UMTS CN answers in a fourth step by sending an assign message ASSIGN2, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

The user equipment UE sets up a third call in a fifth step by sending a setup message SETUP3(A–D) to the core network UMTS CN. This message contains at least information about the requested call type, the subscriber the call should be connected to, and a call identification. The core network UMTS CN answers in a sixth step by sending an assign message ASSIGN3, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

Figure 7:
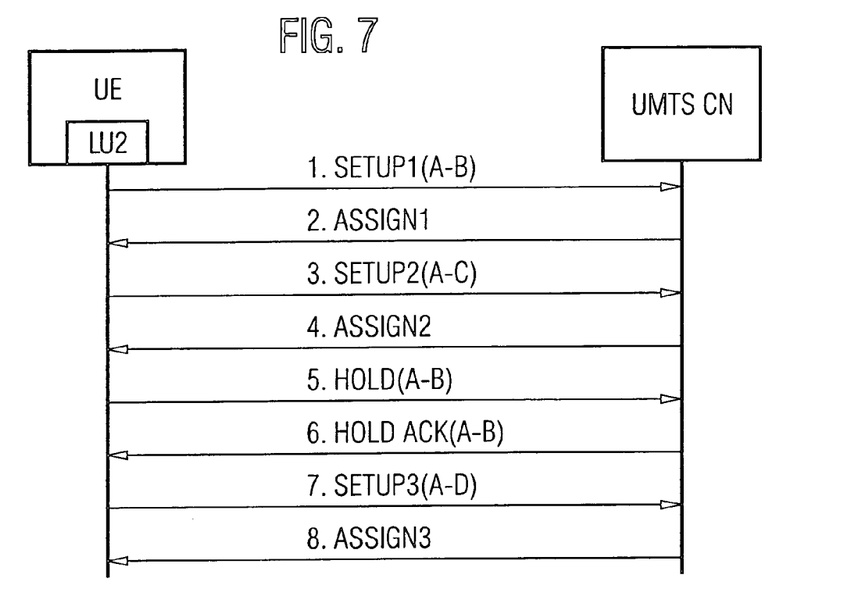
FIG. 7: a signal sequence for the setup of two parallel calls and the hold procedure for a mobile originating call.

In the following the example is described by means of FIG. 7. The mobile user equipment UE sets up a first call in a first step by sending a setup message SETUP1(A–B) to the core network UMTS CN. This message contains at least information about the requested call type, the subscriber the call should be connected to, and a call identification. A call type is an information identifying the type of call, e.g. a full rate speech call or a 64 kbit/s data call.

The core network UMTS CN answers in a second step by sending an assign message ASSIGN 1, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

The mobile user equipment UE sets up a second call in a third step by sending a setup message SETUP2(A–C) to the core network UMTS CN. This message contains at least information about the requested call type, the subscriber the call should be connected to, and a call identification. The core network UMTS CN answers in a fourth step by sending an assign message ASSIGN2, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

Before setting up a third call, the second logical unit LU2 in the mobile user equipment UE decides that one call should be put on hold. The second logical unit LU2 decides that the first call will be put on hold. As already mentioned before, different ways of determining if a call should be put on hold or if a parallel call is allowed, are possible. The mobile user equipment informs the core network UMTS CN about this decision by sending a hold message HOLD(A–B). This message includes an information that a call should be put on hold and a call identification of the call. The core network UMTS CN puts the call on hold and acknowledges by sending a message HOLD ACK(A–B) which includes a call identification of the call that has been put on hold.

Afterwards the mobile user equipment starts to set up a third call by using a new bearer by sending a set up message SETUP3(A–D) to the core network. The new bearer is necessary because an overwriting assignment is performed. An overwriting assignment will remove the user plane of the call that is put on hold and sets up a new user plane according to the bearer of the waiting call. The core network UMTS CN informs the mobile user equipment UE about the new bearer identity by sending an assignment message ASSIGN3.

Figure 8:
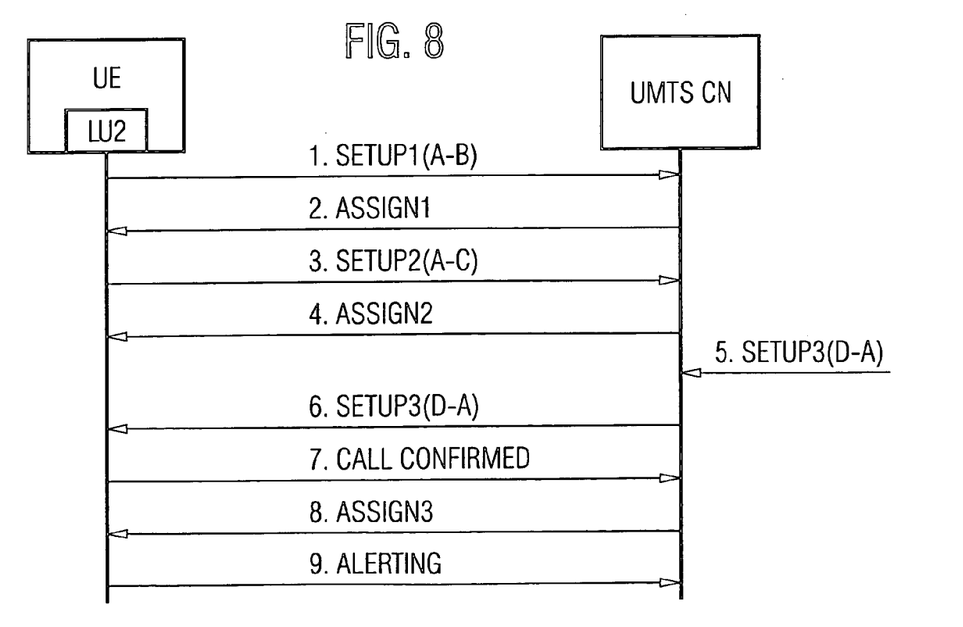
FIG. 8: a signal sequence for the setup of three parallel calls in a communication system for a mobile terminating call.

In the following the example is described by means of FIG. 8. The mobile user equipment UE sets up a first call in a first step by sending a setup message SETUP1(A–B) to the core network UMTS CN. This message contains at least information about the requested call type, the subscriber the call should be connected to, and a call identification. The core network UMTS CN answers in a second step by sending an assign message ASSIGN1, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

The mobile user equipment UE sets up a second call in a third step by sending a setup message SETUP2(A–C) to the core network UMTS CN. This message contains at least information about the requested call type, the subscriber the call should be connected to, and a call identification. The core network UMTS CN answers in a fourth step by sending an assign message ASSIGN2, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

The core network UMTS CN receives a message SETUP3 (D–A) indicating an incoming call attempt. The core network UMTS CN informs the mobile user equipment about the incoming call attempt by sending a set up message SETUP3(D–A). The second logical unit LU2 decides to accept this call as a new parallel call and informs the core network by sending an accept message CALL CONFIRMED containing an indication that the call should be set up as a parallel call. The core network UMTS CN answers by sending an assign message ASSIGN3, which confirms the requested call and contains at least a bearer identification for the call that has been successfully set up. This orders the core network UMTS CN and the mobile user equipment UE to set up a user plane for the requested bearer. The mobile user equipment UE initiates the signalling towards the calling party by sending an alerting message ALERTING to the core network UMTS CN.

Figure 9:
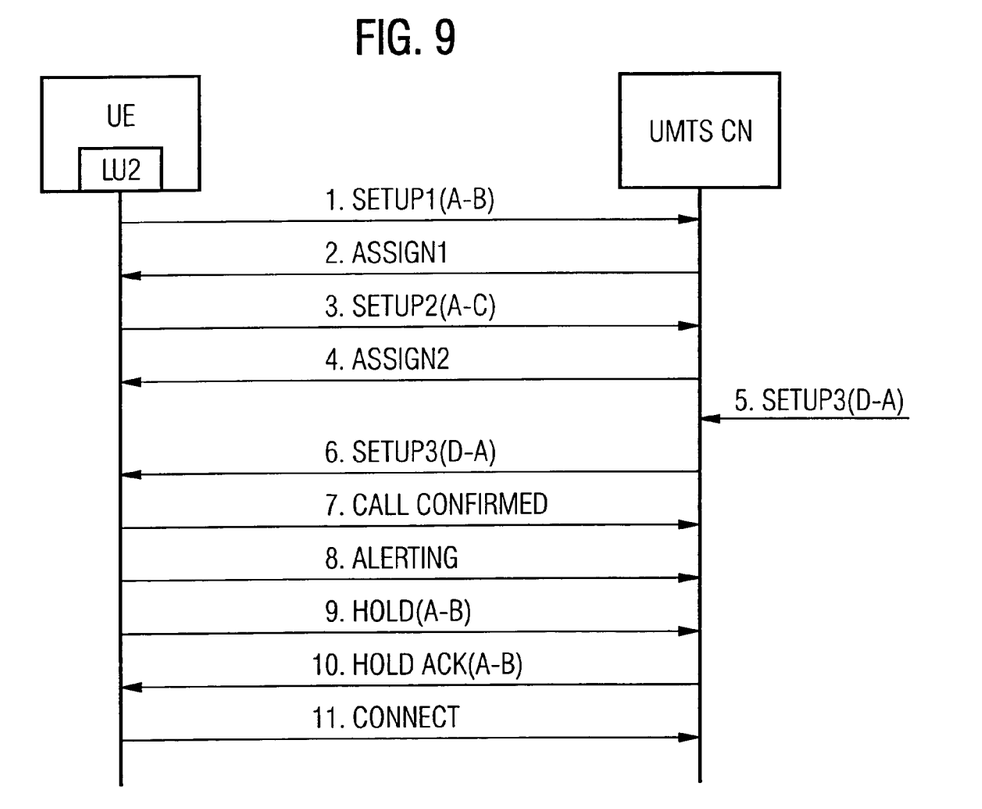
FIG. 9: a signal sequence for the setup of two parallel calls and the hold procedure for a mobile terminating call.

In the following the example is described by means of FIG. 9. The mobile user equipment UE sets up a first call in a first step by sending a setup message SETUP1(A–B) to the core network UMTS CN. This message contains at least information about the requested call type, the subscriber whome should be connected to, and a call identification. The core network UMTS CN answers in a second step by sending an assign message ASSIGN1, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

The mobile user equipment UE sets up a second call in a third step by sending a setup message SETUP2(A–C) to the core network UMTS CN. This message contains at least information about the requested call type, the subscriber the call should be connected to, and a call identification. The core network UMTS CN answers in a fourth step by sending an assign message ASSIGN2, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

The core network UMTS CN receives a message SETUP3 (D–A) indicating an incoming call attempt. The core network UMTS CN informs the mobile user equipment about the incoming call attempt by sending a set up message SETUP3(D–A). The second logical unit LU2 decides to accept this call as a waiting call and the mobile user equipment UE informs the core network UMTS CN by sending an accept message CALL CONFIRMED which contains information that the call shall be set up as a waiting call and a call identification. The mobile user equipment UE initiates the signalling towards the calling party by sending an alerting message ALERTING to the core network UMTS CN. The second logical unit LU2 decides to put the first call on hold and informs the core network UMTS CN by sending a hold message HOLD(A–B) which includes information that a call shall be put on hold and a call identification of this call. The core network UMTS CN puts the call on hold and acknowledges this by sending an acknowledgement message HOLD ACK(A–B). The mobile user equipment activates the waiting call reusing the bearer of the first call by sending a connect message CONNECT.

Figure 10:
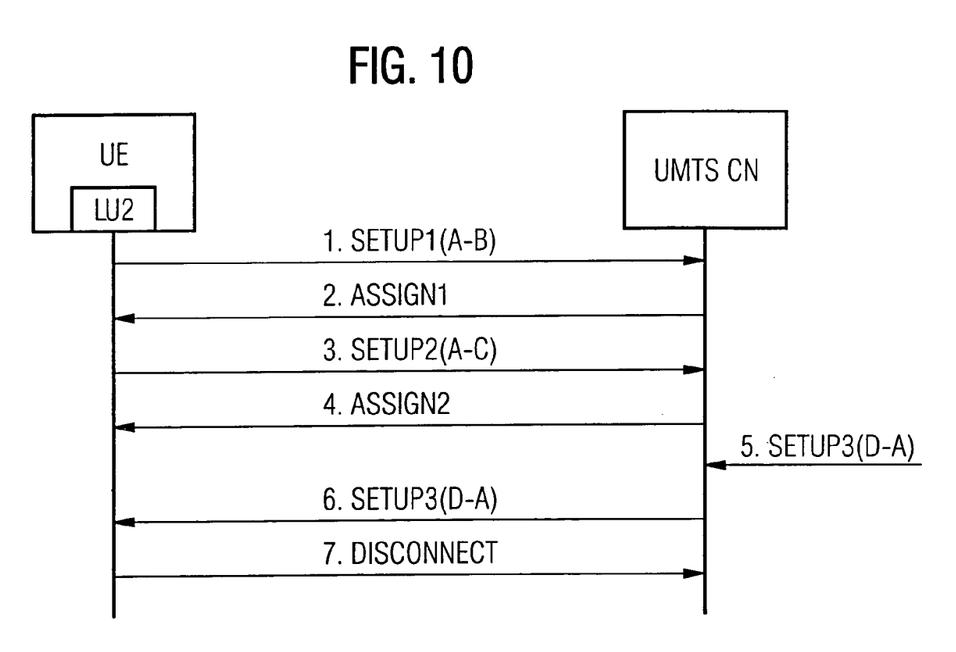
FIG. 10: a signal sequence for the set-up of two parallel calls and the rejection of a third call.

In the following the example is described by means of FIG. 10. The mobile user equipment UE sets up a first call in a first step by sending a setup message SETUP 1(A–B) to the core network UMTS CN. This message contains at least information about the requested call type, the subscriber the call should be connected to, and a call identification. The core network UMTS CN answers in a second step by sending an assign message ASSIGN1, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

The mobile user equipment UE sets up a second call in a third step by sending a setup message SETUP2(A–C) to the core network UMTS CN. This message contains at least information about the requested call type, the subscriber the call should be connected to, and a call identification. The core network UMTS CN answers in a fourth step by sending an assign message ASSIGN2, which confirms the requested call and contains at least a bearer identification for the call that has been successfully set up. This orders the core network UMTS CN and the mobile user equipment UE to set up a user plane for the requested bearer. The second logical unit LU2 stores the relevant information about the call.

The core network UMTS CN receives a message SETUP3 (D–A) indicating an incoming call attempt. The core network UMTS CN informs the mobile user equipment about the incoming call attempt by sending a set up message SETUP3(D–A). The second logical unit LU2 decides to reject this call and the mobile user equipment UE informs the core network UMTS CN by sending a rejection message DISCONNECT. This message DISCONNECT includes information that the call shall be rejected and a call identification of this call. Call forwarding on busy subscriber service may be invoked if the service is active operative for the subscriber.

According to the invention services are provided in a mobile communication system. As the system allows parallel calls, e.g. a UMTS system or any other system allowing multiple calls can be understood. The services provided to a user can be services like call waiting call on Hold etc. known in the area of GSM.

In the following the logical unit according to the invention will be further described (without figure). References known from the figures described before are maintained.

A logical unit in a core network UMTS CN of a mobile communication system handles a number of n calls, with $n=1,2,3,\ldots$ of m different bearer capabilities, with $m=1,2,3\ldots,$.

Further means for comparing a bearer capability requested for a set up of a further call $n+1$ with the bearer capabilities m of the n calls already set up are provided. Therefore the means compares every bearer capability of every call. In addition means for deciding whether a call should be offered as a new parallel call or as a waiting call and for performing the decision are provided. The decision is either based on user setting, e.g. depending on the connected subscriber, the application or capabilities of the mobile user equipment, e.g. number of parallel calls that can be handled, of transmission or network capabilities, e.g. possible number of parallel calls or connections. Storage means for storing information about the active calls, e.g. about call identification, bearer identification and bearer capability are provided, too.

Another logical unit provided in a mobile user equipment of a mobile communication system wherein a number of n calls, with $n=1,2,3,\ldots$ of m different bearer capabilities, with $m=1,2,3\ldots$, are handled is described in the following (without figure).

The logical unit comprises means for comparing a bearer capability requested for a set up of a further call $n+1$ with the bearer capabilities m of the n calls already set up and means for deciding whether a call should be set up as a new parallel call or which of the n calls should be put on hold before setting up or accepting the further call $n+1$. The means for deciding are the same as described before. Further the logical unit comprises means for performing the decision, and storage means storing information about the active calls.

In both logical units mentioned before, means for deciding are influenced by settings of a user. E.g. a user can choose a setting which gives a calling party priority classes. This means a specific caller is always allowed by the user and connected. Another one, e.g. with a lower priority will not be connected.

The user settings mentioned before can either be set once and stay valid until a further setting or they are set before every first attachment to a communication system or can be set before every call set up. These user settings are brought into the logical unit according to the method mentioned before and being part of the invention.

Further means for indicating a mobile user that a decision has to be taken are provided. The indication can be either visible, audible or tactile on the mobile user equipment.

The method and logical units described before provide services that are for example supplementary services inherited from a GSM system by a user in an UMTS system

What is claimed is:

1. A method for providing services to a mobile user equipment in a mobile communication system adapted to send a number n active calls to the mobile user equipment, where n being an integer with m different bearer capabilities associated therewith, and m being an integer, the method comprising the following steps:
    requesting a set-up of an additional call while the number n active calls with m different bearer capabilities associated thereto is set up;
    deciding whether to set up the additional call in parallel, to set up the additional call by choosing one call to be put on hold and by using a bearer associated with the one call put on hold to service the additional call, or to reject a set up of the additional call;
    comparing the bearer capabilities of the n active calls;
    determining whether any of the n active calls has a compatible bearer capability required to service the additional call;
    in the event that at least one of the n calls has a compatible bearer capability as that required to service the additional call, choosing one of the n calls with the compatible bearer capability with the additional call to be put on hold;
    placing a chosen call on hold;
    sending an acknowledgement; and
    setting up the additional call.

2. The method for providing services according to claim 1, wherein the compatible bearer capability is sufficient to be used for the additional call.

3. The method for providing services according to claim 1, further comprising the step of rejecting the additional call for a set up.

4. The method for providing services according to claim 1, wherein the deciding step is influenced by user settings.

5. The method for providing services according to claim 4, wherein the user settings are set once.

6. The method for providing services according to claim 4, wherein the user settings are set before a first attachment to the communication system.

7. The method for providing services according to claim 4, wherein the user settings are set before a call set up.

8. The method for providing services according to claim 1, wherein the deciding step is dependent on settings of parameters.

9. The method for providing services according to claim 1, wherein the choice of a call to be put on hold is influenced by user settings.

10. The method for providing services according to claim 1, further comprising the step of deciding that the additional call is put in a call waiting stage.

11. The method for providing services according to claim 1, further comprising the step of setting up a conference call with a plurality of users.

12. The method for providing services according to claim 1, wherein a call is forwarded to another user.

13. The method for providing services according to claim 1, wherein the services are supplementary services inherited from a GSM system by a user in an UMTS system.

14. The method for providing services according to claim 1, wherein the compatible bearer capability is identical to a bearer capability of one of the n active calls.

15. A logical unit of a mobile communication system adapted to allow a mobile user equipment to utilize a number n active calls, n being an integer, and a number m bearer capabilities associated therewith, m being an integer, comprising:
    a means for requesting a set-up of an additional call while the number n active calls with m bearer capabilities associated thereto is set up;
    a first unit operable to decide whether to set up the additional call in parallel, to set up the additional call by choosing one call to be put on hold and by using a bearer associated with the one call put on hold to service the additional call, or to reject a set up of the additional call
    a comparator operable to execute instructions for:
        comparing the bearer capabilities of the n active calls;
        determining whether any of the n active calls has a compatible bearer capability required to service the additional call;
        in the event that at least one of the n calls has a compatible bearer capability as that required to service the additional call, choosing one of the n calls with the compatible bearer capability with the additional call to be put on hold;
        placing a chosen call on hold;
        sending an acknowledgement;
        setting up the additional call; and
    a storage unit operable to store information about the active calls.

16. The logical unit according to claim 15, wherein the information stored within the storage unit indicates call identification, bearer identification and bearer capability.

17. The logical unit according to claim 15, wherein the first unit is influenced by user settings defining the decision outcome.

18. The logical unit according to claim 17, wherein the user settings are set once.

19. The logical unit according to claim 17, wherein the user settings are set before a first attachment to the communication system.

20. The logical unit according to claim 17, wherein the user settings are set before a call set up.

21. The logical unit according to claim 15, further comprising an indicator operable to indicate to a mobile user that a decision has to be taken.

22. The logical unit according to claim 15, wherein said logical unit is located within a core network of said mobile communication system.

23. The logical unit according to claim 15, wherein said logical unit is located in a mobile user equipment of said mobile communication system.

* * * * *

UNITED STATES PATENT AND TRADEMARK OFFICE
CERTIFICATE OF CORRECTION

PATENT NO. : 7,092,698 B1 Page 1 of 1
APPLICATION NO. : 09/531917
DATED : August 15, 2006
INVENTOR(S) : Sharp et al.

It is certified that error appears in the above-identified patent and that said Letters Patent is hereby corrected as shown below:

On Page 2, in item (56), under "U.S. Patent Documents", in Column 2, Line 5, delete "B1" and insert -- B2 --, therefor.

On the Title Page, in item (57), under "Abstract", in Column 2, Line 15, after "this" insert -- , --.

In Column 3, Line 10, delete "advantageous" and insert -- advantage --, therefor.

In Column 3, Line 56, delete "Ito 10" and insert -- 1 to 10 --, therefor.

In Column 11, Line 2, delete "whome" and insert -- whom --, therefor.

In Column 12, Line 19, after "call waiting" insert -- . --.

In Column 12, Line 19, delete "Hold" and insert -- hold --, therefor.

In Column 14, Line 22, in Claim 15, after "call" insert -- ; --.

Signed and Sealed this

Eighteenth Day of December, 2007

JON W. DUDAS
*Director of the United States Patent and Trademark Office*